US011415587B2

(12) United States Patent
Umeki et al.

(10) Patent No.: US 11,415,587 B2
(45) Date of Patent: Aug. 16, 2022

(54) SAMPLE CONTAINER TRANSFER DEVICE

(71) Applicant: Hitachi High-Technologies Corporation, Tokyo (JP)

(72) Inventors: Taro Umeki, Tokyo (JP); Kouji Kamoshida, Tokyo (JP); Masahito Kakuno, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 312 days.

(21) Appl. No.: 16/493,810

(22) PCT Filed: Feb. 27, 2018

(86) PCT No.: PCT/JP2018/007178
§ 371 (c)(1),
(2) Date: Sep. 13, 2019

(87) PCT Pub. No.: WO2018/168438
PCT Pub. Date: Sep. 20, 2018

(65) Prior Publication Data
US 2020/0025781 A1 Jan. 23, 2020

(30) Foreign Application Priority Data
Mar. 16, 2017 (JP) .............................. JP2017-050765

(51) Int. Cl.
*G01N 35/04* (2006.01)
(52) U.S. Cl.
CPC ....... *G01N 35/04* (2013.01); *G01N 2035/047* (2013.01); *G01N 2035/0462* (2013.01);
(Continued)
(58) Field of Classification Search
CPC .......... G01N 35/04; G01N 2035/0462; G01N 2035/0465; G01N 2035/047;
(Continued)

(56) References Cited

U.S. PATENT DOCUMENTS

2011/0271773 A1* 11/2011 Komatsu ............ G01N 35/0092
73/863.01
2013/0078617 A1 3/2013 Ueda et al.
(Continued)

FOREIGN PATENT DOCUMENTS

EP 2 799 885 A1 11/2014
EP 3 064 947 A1 9/2016
(Continued)

OTHER PUBLICATIONS

Extended European Search Report issued in European Application No. 18767368.6 dated Dec. 4, 2020 (11 pages).
(Continued)

*Primary Examiner* — Jill A Warden
*Assistant Examiner* — John McGuirk
(74) *Attorney, Agent, or Firm* — Crowell & Moring LLP

(57) ABSTRACT

It is possible to realize a sample container transfer device capable of handling a plurality of racks in which a sample container can be efficiently transferred from a preprocessing system to a carrier used in an analysis system and can be transferred to a plurality of kinds of carriers of the analysis system. A plurality of kinds of racks A and racks B is held by an empty rack holding area 330. The racks A or the racks B can be used for conveyance of specimen containers according to the application of a specimen. After a fixed number of specimen containers separated by a separation mechanism 301 according to an application are collected by stoppers 303*a* and 303*b*, the specimen containers are conveyed to a transfer start position 309 to be transferred from a holder to a rack. Accordingly, it is possible to suppress an occurrence of a state in which the rack does not have a part where no specimen is mounted.

4 Claims, 10 Drawing Sheets

(52) U.S. Cl.
    CPC ............... *G01N 2035/0465* (2013.01); *G01N 2035/0491* (2013.01)

(58) Field of Classification Search
    CPC ....... G01N 2035/0491; G01N 35/0092; G01N 2035/0415; G01N 35/0099; G01N 35/026
    See application file for complete search history.

(56) References Cited

U.S. PATENT DOCUMENTS

| | | | |
|---|---|---|---|
| 2014/0208872 A1 | 7/2014 | Yasuzawa et al. | |
| 2014/0294699 A1 | 10/2014 | Akutsu et al. | |
| 2015/0093290 A1 | 4/2015 | Takai et al. | |
| 2016/0244269 A1 | 8/2016 | Akutsu | |
| 2017/0254827 A1 * | 9/2017 | Walker | .................. G01N 35/04 |

FOREIGN PATENT DOCUMENTS

| | | | | |
|---|---|---|---|---|
| JP | 7-280815 A | 10/1995 | | |
| JP | 2973133 B2 * | 11/1999 | | |
| JP | 2973133 B2 | 11/1999 | | |
| JP | 4669288 B2 | 4/2011 | | |
| JP | 2013-72783 A | 4/2013 | | |
| JP | 2015-68727 A | 4/2015 | | |
| JP | WO2015064540 A1 * | 3/2017 | ............ | B65G 43/00 |
| WO | WO 2013/042549 A1 | 3/2013 | | |
| WO | WO 2013/099538 A1 | 7/2013 | | |
| WO | WO 2015/064540 A1 | 5/2015 | | |
| WO | WO-2015165014 A1 * | 11/2015 | ............ | G06F 16/00 |

OTHER PUBLICATIONS

International Search Report (PCT/ISA/210) issued in PCT Application No. PCT/JP2018/007178 dated May 29, 2018 with English translation (four (4) pages).

Japanese-language Written Opinion (PCT/ISA/237) issued in PCT Application No. PCT/JP2018/007178 dated May 29, 2018 (four (4) pages).

International Preliminary Report on Patentability (PCT/IB/338 & PCT/IB/373) issued in PCT Application No. PCT/JP2018/007178 dated Sep. 26, 2019, including English translation of document C2 (Japanese-language Written Opinion (PCT/ISA/237) previously filed on Sep. 13, 2019) (nine (9) pages).

* cited by examiner

RACK A (FOR ANALYSIS ITEM A)

SAMPLE CONTAINER TRANSFER DEVICE

TECHNICAL FIELD

The present invention relates to a sample container transfer device in a specimen inspection processing system suitable for automatically conducting a specimen inspection in a clinical inspection field.

BACKGROUND ART

A specimen such as blood or urine is analyzed for a clinical inspection in hospitals or inspection facilities. However, a specimen from a patient or the like is not necessarily provided for an analysis as it is, and is preprocessed for the analysis in many cases.

An example of an automated system from such preprocessing to an analysis is described in Patent Literature 1.

In the specimen processing system as described above, a carrier is used to hold and convey a sample container such as a specimen container.

Different kinds of carriers are used in some cases between a specimen preprocessing system and a specimen analysis system. For example, the preprocessing system has a system configuration in which a specimen container is conveyed by a carrier (holder) mounting one specimen container. In addition, the analysis system occasionally has a system configuration in which specimen containers are conveyed by a carrier (rack) that collectively holds up to five specimen containers.

In the case where conveyance of specimen containers is automated by connecting the preprocessing system and the analysis system to each other, for example, it is necessary to provide a transfer device that moves the specimen container between the carriers from the carrier (holder) used in the preprocessing system to the carrier (rack) used in the analysis system.

Such a transfer device of a specimen container is disclosed in, for example, Patent Literature 2.

CITATION LIST

Patent Literature

Patent Literature 1: Japanese Unexamined Patent Application Publication No. Hei 7 (1995)-280815
Patent Literature 2: Japanese Patent No. 4669288

SUMMARY OF INVENTION

Technical Problem

By the way, the number of kinds of carriers used in the analysis system is not limited to one, and there is an analysis system that uses a plurality of kinds of carriers (for example, the shapes of five-racks differ). In the case where the analysis system and the preprocessing system are connected to each other, a specimen transfer device in which specimen containers can be conveyed by being transferred to a plurality of kinds of carriers is needed.

However, a transfer of the specimen containers to the plurality of kinds of carriers is not described in Patent Literature 1 and Patent Literature 2.

In addition, specimens mounted on carriers (for example, one-holders) conveyed in the preprocessing system are not necessarily conveyed according to the number of carriers used in the analysis system.

Therefore, there is a case in which the specimens are conveyed to the analysis system in a state where the carrier used in the analysis system has a part where no specimen is mounted. The conveyance in a state where the carrier has a part where no specimen is mounted results in a deterioration in processing efficiency of the analysis system, and leads to a delay of reporting an inspection result.

Even this point is not described in Patent Literature 1 and Patent Literature 2.

In view of the foregoing, an object of the present invention is to realize a sample container transfer device that can efficiently transfer a sample container from a preprocessing system to a carrier used in an analysis system and can transfer the sample container to a plurality of kinds of carriers of the analysis system.

Solution to Problem

In order to achieve the above-described object, the present invention is configured as follows.

A sample container transfer device comprises:
a first carrier conveyance path that conveys a first carrier mounting a sample container from a preprocessing system; a second carrier discharge path that discharges a plurality of kinds of second carriers mounting a plurality of sample containers to an analysis system; a transfer machine that transfers the sample container mounted on the first carrier to the second carrier; and an operation control unit that controls operations of the first carrier conveyance path, the second carrier discharge path, and the transfer machine, selects any one of the plurality of kinds of second carriers in accordance with the application of a sample in the sample container mounted on the first carrier or the shape of the sample container, and transfers the sample container mounted on the first carrier to the selected second carrier.

Advantageous Effects of Invention

According to the present invention, it is possible to realize a sample container transfer device that can efficiently transfer a sample container from a preprocessing system to a carrier used in an analysis system and can transfer the sample container to a plurality of kinds of carriers of the analysis system.

DESCRIPTION OF EMBODIMENTS

Hereinafter, embodiments of the present invention will be described with reference to the accompanying drawings.

Embodiments

First Embodiment

Figure 1:
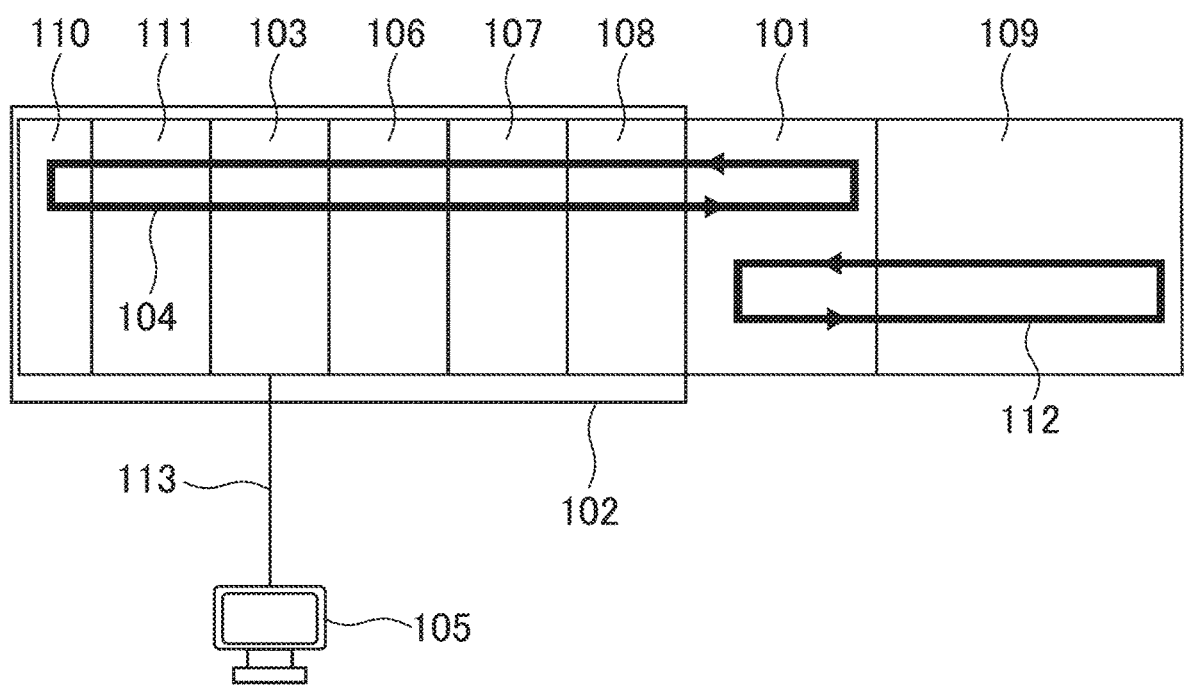
FIG. 1 is an outline configuration diagram of a specimen conveyance system including a specimen transfer device to which the present invention is applied.

FIG. 1 is an outline configuration diagram of a specimen conveyance system including a specimen transfer device 101 to which the present invention is applied.

In FIG. 1, information is transmitted and received between a plurality of devices and a controlling computer (operation control unit) 105 via a communication circuit 113. A specimen to be analyzed is fed to a specimen feeding device 103 of a preprocessing system 102, and conveyance of the specimen is started. In the preprocessing system 102, the specimen is conveyed on a carrier (for example, a one-holder (first carrier)) that conveys each specimen. The one-holder is conveyed along a holder conveyance route 104.

The specimen fed from the specimen feeding device 103 is prepared to be conveyed to an analysis system 109 via a centrifugal device 106, an unplugging device 107, and a dispensing device 108 in accordance with an instruction of the controlling computer 105. The specimen is conveyed to the analysis system 109 via a transfer device 101 in accordance with an instruction of the controlling computer 105. The specimen is conveyed to a specimen housing device 111 via a plugging device 110 in some cases.

It is assumed that the analysis system 109 uses a carrier (for example, a five-rack (second carrier)) on which a plurality of specimens can be mounted. In the analysis system 109, the five-rack is conveyed along a rack conveyance route 112. Thus, in the transfer device 101, the specimen housed in a specimen container is arranged between systems using different conveyance carriers and is transferred between the carriers using the transfer mechanism.

In addition, it is assumed that a specimen for which an analysis was completed by the analysis system 109 is conveyed to the plugging device 110 and the specimen housing device 111 of the preprocessing system 102 via the transfer device 101. Thus, the specimen is conveyed from the preprocessing system 102 to the analysis system 109 or from the analysis system 109 to the preprocessing system 102. Therefore, it is necessary for the transfer device 101 to transfer the specimens from the one-holder (the holder holding one specimen container) to the five-rack (the rack holding five specimen containers) and from the five-rack to the one-holder.

Figure 2:
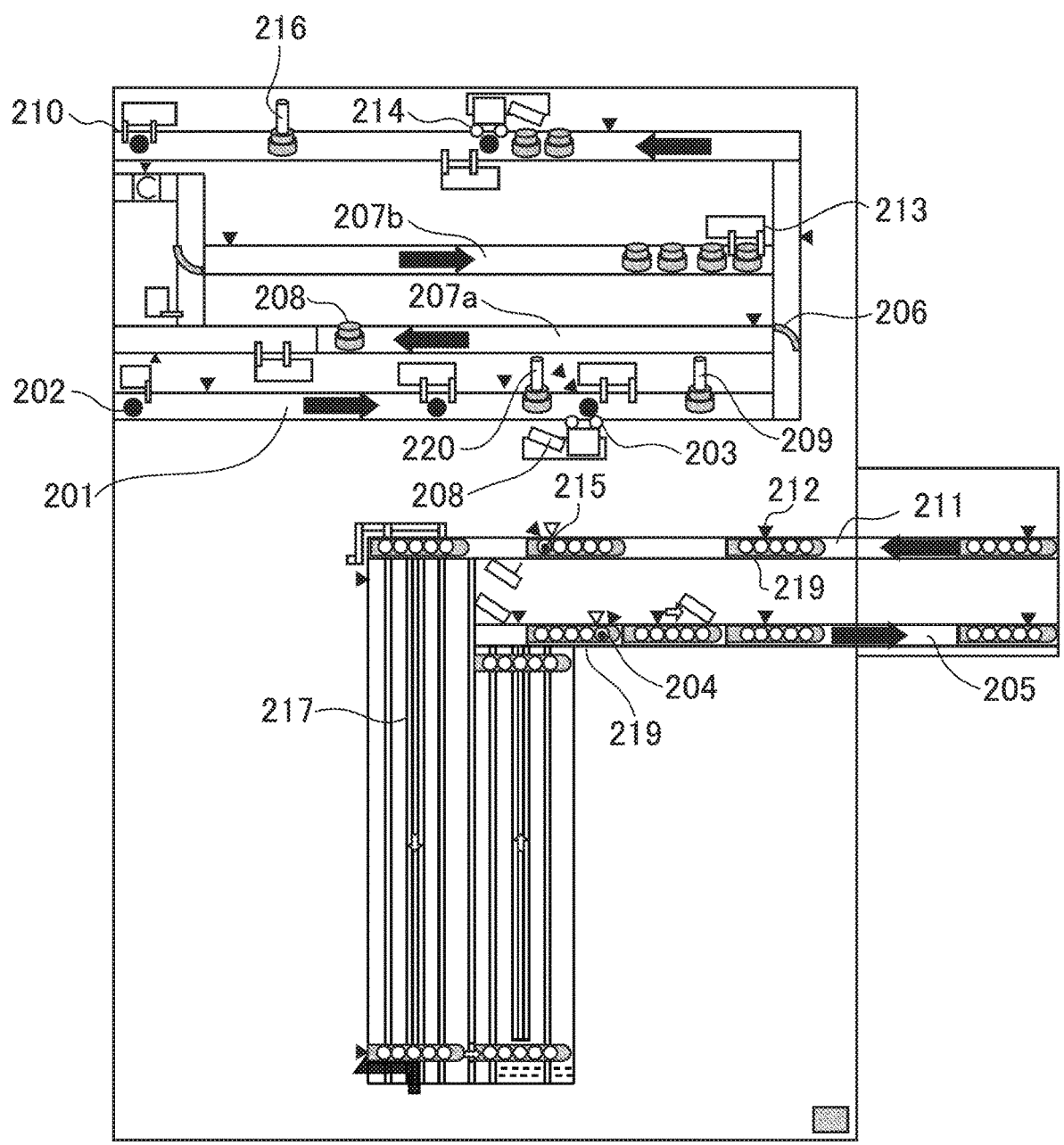
FIG. 2 is an outline configuration diagram of a transfer device as an example different from the present invention.

FIG. 2 is an outline configuration diagram of a transfer device as an example different from the present invention, and is a diagram to be compared with the present invention.

In FIG. 2, a line 201 is a line that is connected to the preprocessing system 102 and discharges or carries in a holder 218 on which a specimen container 220 is placed. Arrows in FIG. 2 show the directions in which a one-holder 218 and a five-rack 219 are conveyed. In a transfer of the specimen container from the one-holder 218 to the five-rack 219, the specimen container from the preprocessing system 102 is received at a specimen container reception position 202, and is conveyed to a transfer start position 203 for the rack 219.

The specimen container is transferred using a transfer mechanism (not shown in FIG. 2), and is moved to a rack transfer destination position 204. The rack 219 by which the specimen transfer was completed is conveyed on an analysis system connection line 205, and is discharged to the analysis system 109. The holder (empty holder) 218, at the transfer start position 203, on which no specimen container is placed after the transfer of the specimen container is conveyed to an empty holder conveyance line 207a through a separation 206.

In addition, there is a case in which the specimen container is not transferred at the transfer start position 203. The specimen container is not transferred in the case where a bar-code reader 208 cannot recognize a specimen in the specimen container 218 or the controlling computer 105 determines that no transfer is needed. In this case, the holder is conveyed to a conveyance position 210 for the preprocessing system 102 while placing the specimen container 220 housing a specimen 209 thereon.

In the specimen transfer operation from the five-rack 219 to the one-holder 218, the rack 219 is received from the analysis system 109 on a line 211. When a sensor 212 detects the rack 219, the empty holder 218 is discharged from a discharge position 213 of an empty holder conveyance line 207b, and is conveyed to a holder transfer destination position 214. A position 215 is a transfer start position for the holder 218, and the specimen container is transferred from the transfer start position 215 to the holder transfer destination position 214 using the transfer mechanism (not shown in FIG. 2) when conditions are satisfied. The transferred specimen container 216 is conveyed to the conveyance position 210 while being placed on the holder 218, and is discharged to the preprocessing system 102. The rack 219 by which the transfer was completed and on which no specimen container 220 is placed is conveyed to an empty rack holding unit 217, and is reused as the rack 219 conveyed to the analysis system 109 for the next time.

In the example shown in FIG. 2, the number of kinds of racks 219 is one, and plural kinds of racks cannot be used according to an application. In addition, the number of specimen containers that can be transferred to the rack is not considered in the example of FIG. 2, and thus it is difficult to suppress a state in which the rack used in the analysis system 109 has a part where no specimen container is mounted.

Figure 3:
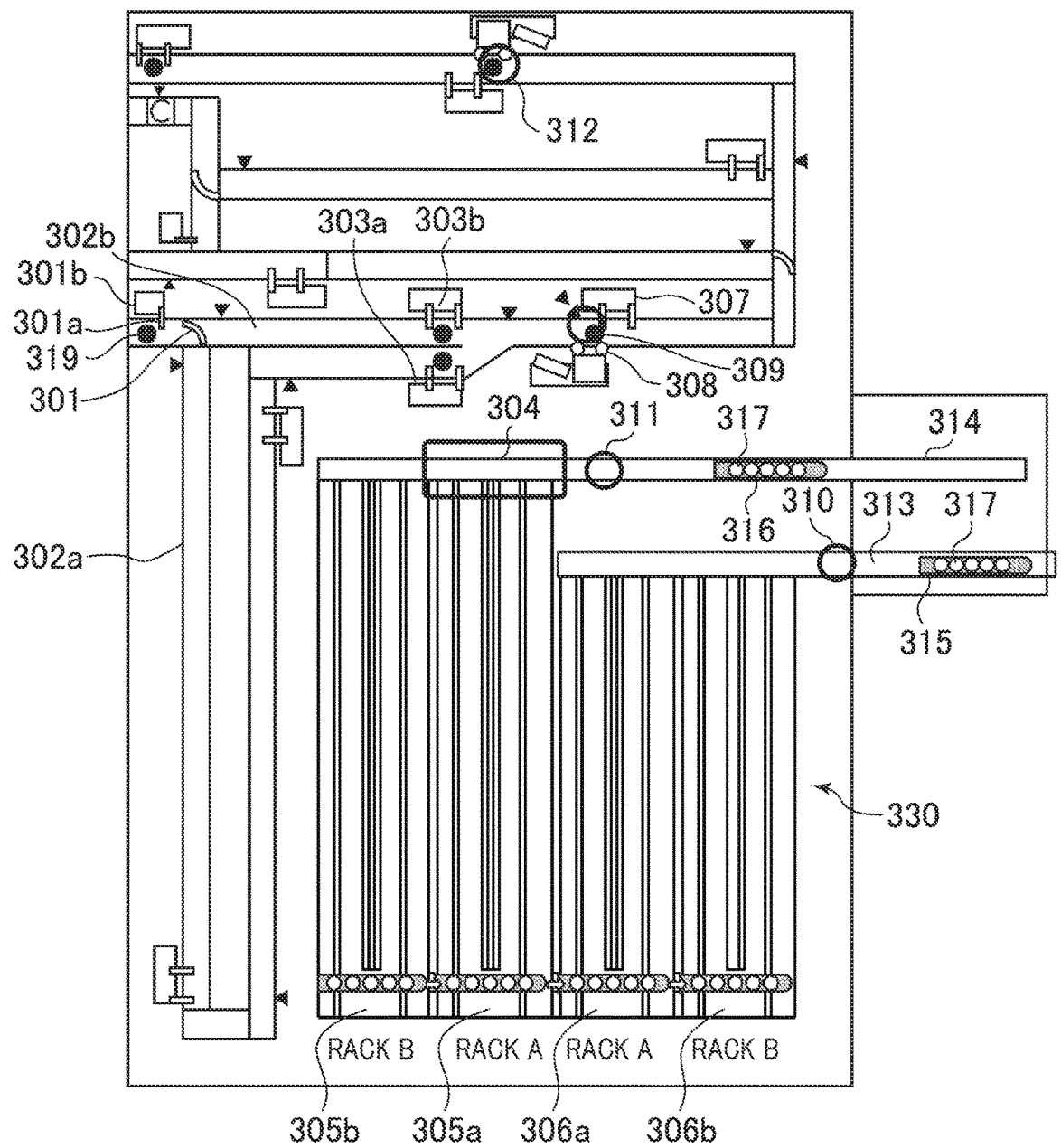
FIG. 3 is an outline configuration diagram of a specimen transfer device according to a first embodiment of the present invention.

FIG. 3 is an outline configuration diagram of a specimen transfer device according to a first embodiment of the present invention.

In FIG. 3, when receiving a holder 319 that is stopped by a stopper 301b at a specimen container reception position 301a where a specimen container 317 is received from the preprocessing system 102, the holder 319 is separated into a conveyance line 302a or a conveyance line 302b by a separation mechanism 301 in accordance with analysis items for a specimen housed in a specimen container 317 mounted on the holder 319 by communicating with the controlling computer 105. In order to identify each holder, each holder has ID information stored in an information recording medium such as an RFID tag, an IC chip, or a bar-code label.

The analysis items for the specimen are determined by reading the ID or the like given to the holder 319 with an ID reader installed at a specimen container reception position 301a and by communicating with the controlling computer 105, and the operations of the stopper 301b and the separation mechanism 301 are controlled.

The separation conditions can be set by the controlling computer 105. As described above, the holder is separated on the basis of conditions such as other applications and the shape of the container (specimen container) in addition to the analysis items, and a rack for transferring the specimen container is selected. Accordingly, as a container mounted on the holder 319, not only a container housing a specimen but also a container of a solution for calibration conducted by the analysis system 109 or a container of a QC sample (accuracy management sample) can be separated so as to be transferred to a proper rack. Container type information for identifying the type of a container is recorded in an information storage medium such as a bar-code label attached to the container. The specimen feeding device 103 is provided with a reading device such as a bar-code reader to read the information storage medium attached to the fed specimen container, and associates the read container type information with the ID information of the holder 319 to be stored in the controlling computer 105. Therefore, the specimen transfer device 101 can identify the type of the container only by reading the ID information of the holder 319 to be transferred to a proper rack.

A stopper 303a is arranged at the line 302a, a stopper 303b is arranged at the line 302b, and the holder 319 is stopped by the stopper 303a or 303b.

When the holders 319 mounting the specimen containers the number of which matches that of specimen containers mounted on a rack 315 are collected at the stopper 303a or 303b, the stopper 303a or the stopper 303b is operated from stop to release, and the holders 319 are conveyed to a transfer start position 309 for the rack 315. At the transfer start position 309, each holder 319 is stopped by a stopper 307. Then, it is determined whether the holder 319 that stopped was conveyed from the line 302a or the line 302b. Then, a proper rack 315 is arranged at a rack transfer destination position 310 on the basis of the determination.

In addition, the bar-code of the specimen container is read by a bar-code reader 308 at the transfer start position 309. In the case where the content indicated by the read bar-code is determined as an error in such a case that the specimen in the specimen container mounted on the holder 319 cannot be recognized or a case that the controlling computer 105 determines that no transfer is needed, one of the following process 1 or process 2 is executed.

In the process 1, the specimen container determined as an error is conveyed to a holder discharge line 324 without being transferred to the rack 315, and is discharged to the preprocessing system 102. In this case, the specimen containers the number of which is less than a predetermined number are transferred to the rack 315 at the rack transfer destination position 310 on a rack conveyance line 313. Namely, the rack 315 with an empty position for the specimen container determined as an error is conveyed to the analysis system 109.

In the process 2, as similar to the process 1, the specimen container determined as an error is conveyed to the holder discharge line 324 without being transferred to the rack 315, and is discharged to the preprocessing system 102. Then, in the case where there is a specimen container mounted on the holder 319 stopped by the stopper 303a or the stopper 303b, the specimen containers the number of which matches that of specimen containers determined as an error are conveyed to the transfer start position 309. At the transfer start position 309, the bar-code of the specimen container is read by the bar-code reader 308 to be determined as an error or not. In the case of no error, the specimen container is transferred to the rack 315. In the case where there is no specimen container stopped by the stopper 303a or the stopper 303b, the rack 315 with an empty position for the specimen container determined as an error is conveyed to the analysis system 109 as similar to the process 1.

On the other hand, a rack discharge line (second carrier discharge route) 313 and a rack carry-in line (second carrier carry-in route) 314 are used to convey the rack 315 (the rack conveyed to the analysis system 109) and the rack 316 (the rack conveyed from the analysis system 109). An empty rack holding area (second carrier holding area) 330 holds two kinds of racks (a rack A and a rack B), the rack A or the rack B is conveyed to the rack conveyance line 313 in accordance with the use application of the analysis system 109.

The rack 316 conveyed from the analysis system 109 through a rack conveyance line 314 transfers the specimen container 317 mounted on the rack 316 to the holder 319 at a collection specimen transfer position 311 to be conveyed to a rack sorting area 304. In the rack sorting area 304, the kind of rack 316 is discriminated, and the rack 316 is conveyed to any one of rack carry-in lines 305a and 305b of the empty rack holding area 330. The rack 316 is conveyed from the rack carry-in line 305a or 305b to a rack discharge line 306a or 306b, and is conveyed to the rack transfer destination position 310 in accordance with an instruction of the controlling computer 105.

A rack having a rack kind A is carried in to the rack carry-in line 305a, and a rack having a rack kind B is carried in to the rack carry-in line 305b. In addition, the rack having the rack kind A is arranged on the rack discharge line 306a, and the rack having the rack kind B is arranged on the rack discharge line 306b.

Figure 4A:
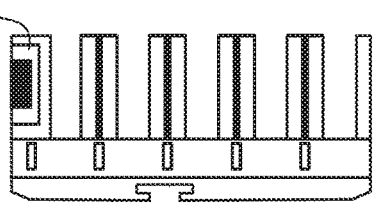
FIG. 4A is a front view of a rack A.
Figure 4B:
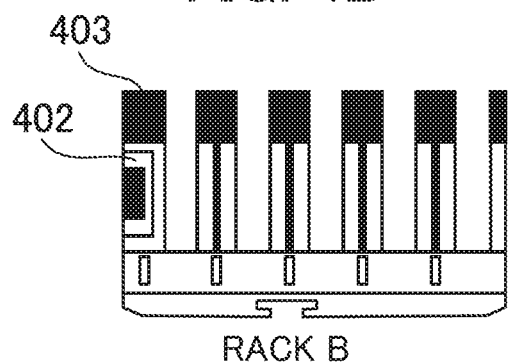
FIG. 4B is a front view of a rack B.
Figure 5A:
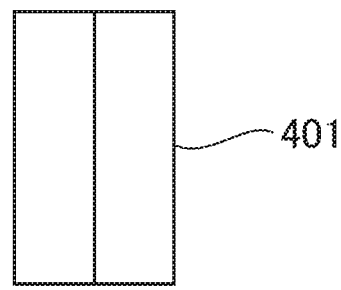
FIG. 5A is a side view of the rack A.
Figure 5B:
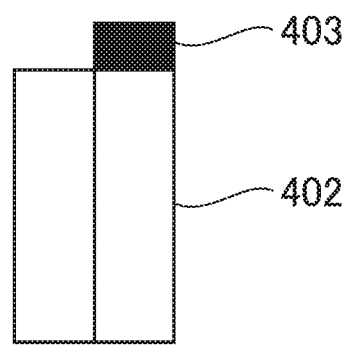
FIG. 5B is a side view of the rack B.

FIG. 4A is a front view of the rack A of two kinds of rack examples, and FIG. 4B is a front view of the rack B. FIG. 5A is a side view of the rack A, and FIG. 5B is a side view of the rack B. A rack 401 of FIG. 4A or FIG. 5A is the rack A (for analysis item A), and a rack 402 of FIG. 4B or FIG. 5B is the rack B (for analysis item B). In the case where the rack A of the rack 401 is set as a reference, the rack 402 is a rack obtained by attaching an adaptor 403 to the rack 401. The specimen can be fixed stronger by attaching the adaptor.

Figure 6:
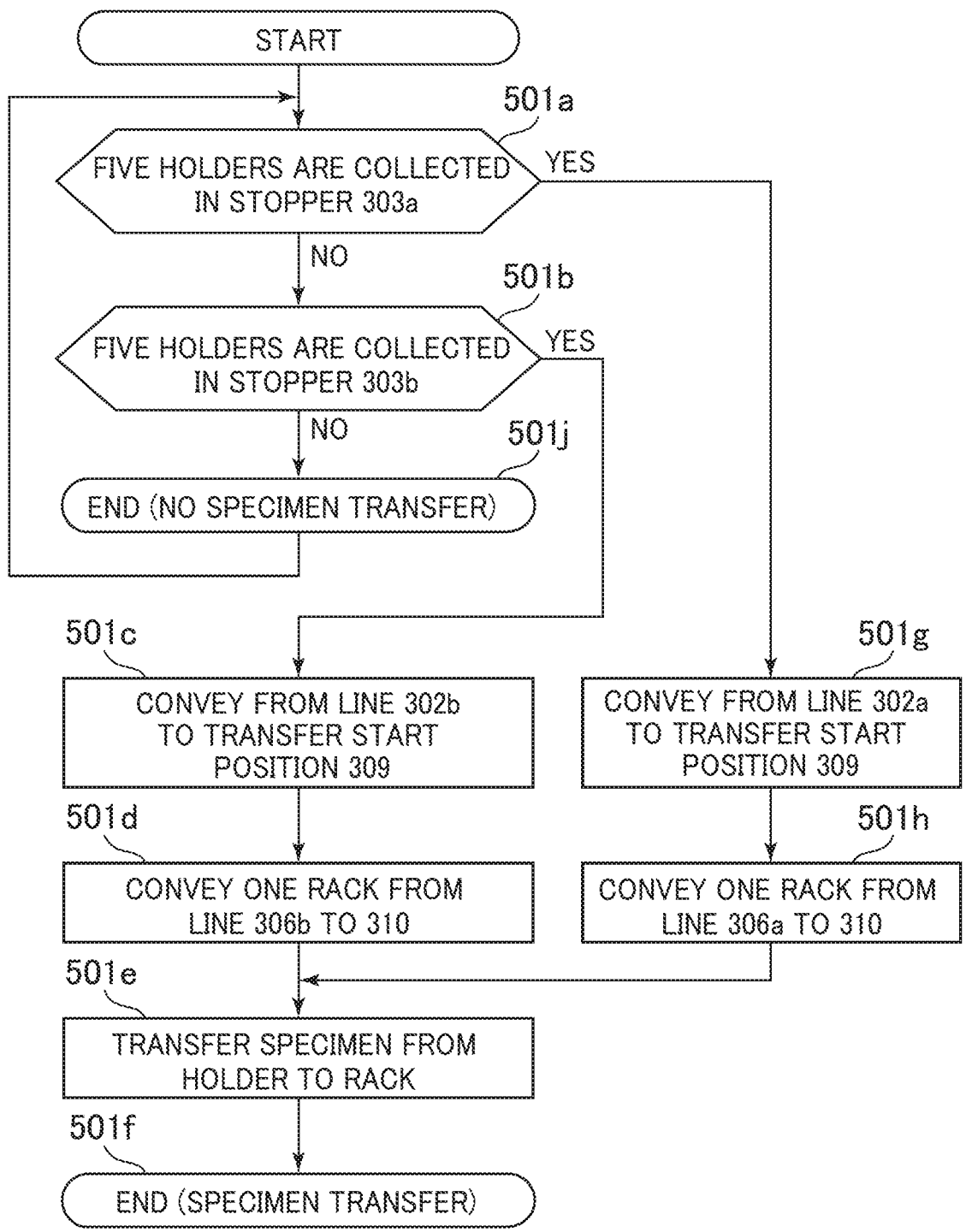
FIG. 6 is a flow diagram related to a specimen transfer from a holder to a rack.

FIG. 6 is a flow diagram related to the specimen transfer from the holder 319 to the rack 315.

In Steps 501a and 501b of FIG. 6, the number of holders 319 being stopped by the stoppers 303a and 303b is confirmed. No rack is conveyed until five holders are collected on anyone of the lines (Step 501j).

When five holders 319 are collected at any one of the stoppers 303a and 303b in Step 501a or 501b, the holders are conveyed to the transfer start position 309 (Steps 501c and 501g). At this time, the rack 315 (the rack A or the rack B) is conveyed from the rack conveyance lines 306a and 306b to the transfer position 310 (Steps 501d and 501h). When the conveyance of the holders 319 and the rack 316 is completed, five consecutive specimen transfers are performed from the holders 319 to the rack 315 (Step 501e). Then, the process id finished (Step 501f).

Figures 7A, 7B, 7C, 7D, 7E:
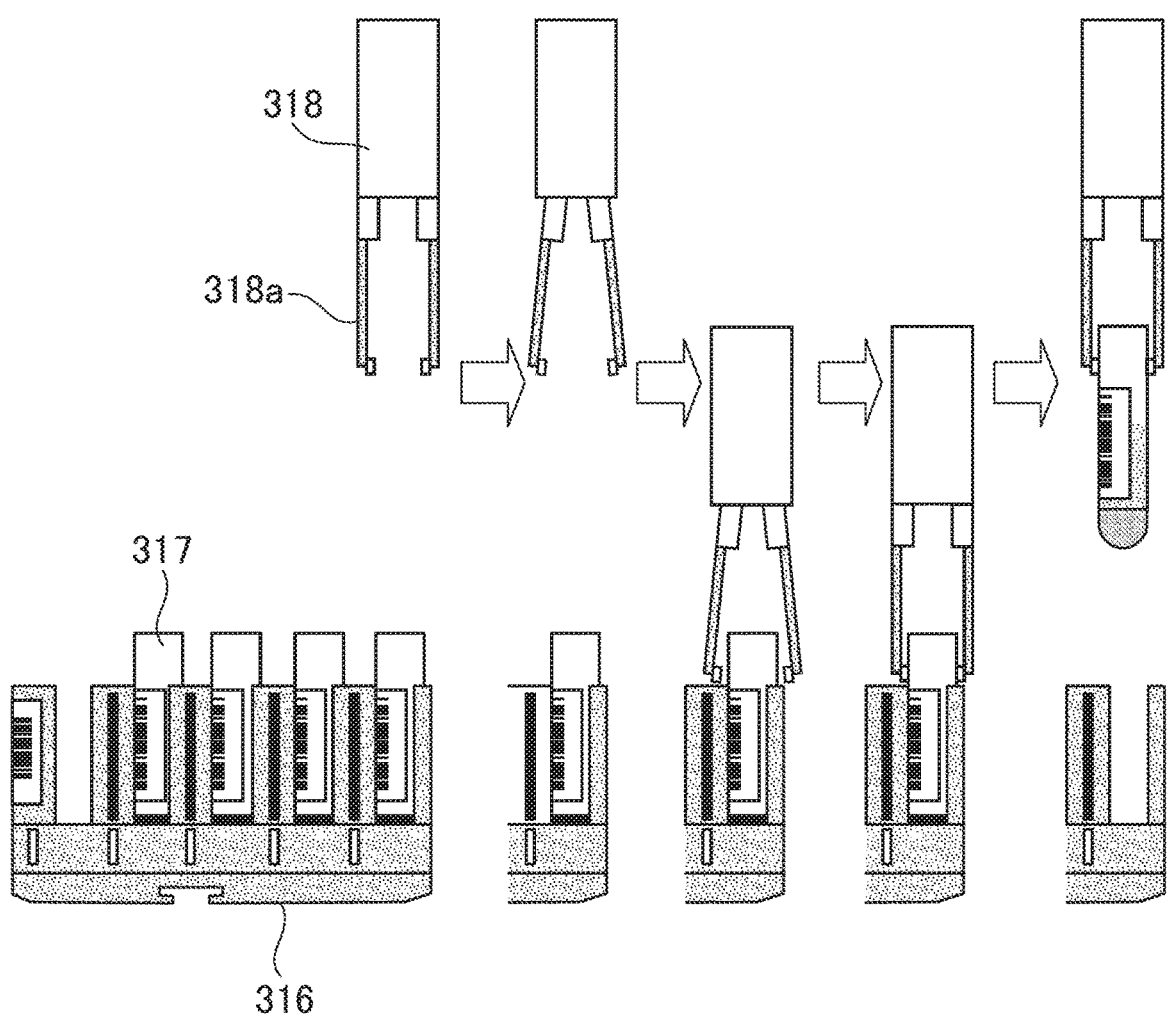
FIGS. 7A to 7E are explanatory diagrams of a transfer mechanism of a specimen container, and are explanatory diagrams exemplifying a case in which the specimen container is transferred from the rack to the holder.
Figures 8A, 8B, 8C, 8D:
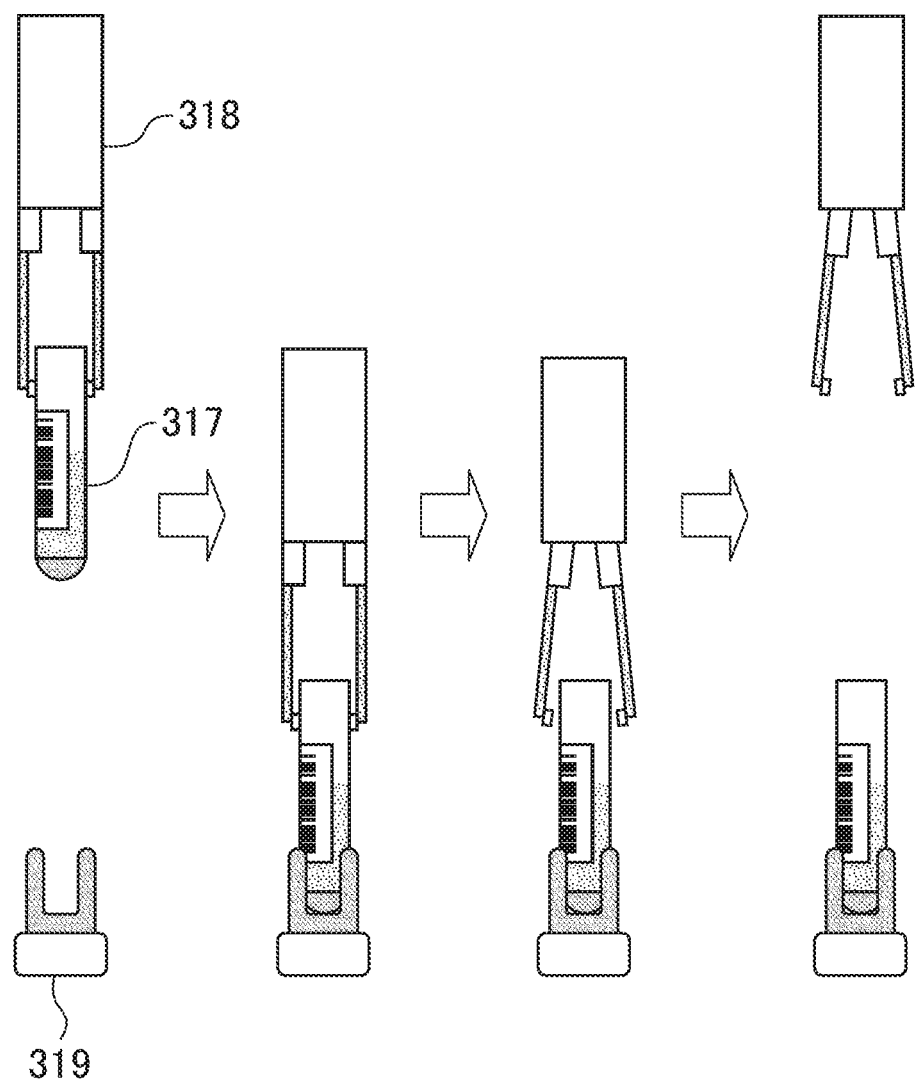
FIGS. 8A to 8D are explanatory diagrams of the transfer mechanism of the specimen container, and are explanatory diagrams exemplifying a case in which the specimen container is transferred from the rack to the holder.

Each of FIG. 7 and FIG. 8 is an explanatory diagram of a transfer mechanism 318 of a specimen container, and is an explanatory diagram exemplifying a case in which the specimen container 317 is transferred from the rack 316 to the holder 319. In (A) of FIG. 7, the transfer mechanism 18 has a chuck mechanism 318a, and is moved to an upper position of the specimen container 317 to be gripped by the chuck mechanism 318a. The chuck mechanism 318a is opened in (B) of FIG. 7, and is moved downward to be positioned above the specimen container 317 and the upper portion of the specimen container 317 is positioned between grip parts of the chuck mechanism 318a in (C) of FIG. 7. Then, the grip parts of the chuck mechanism 318a are closed to grip the upper portion of the specimen container 317 in (D) of FIG. 7, and the specimen container 317 is lifted upward as shown in (E) of FIG. 7.

Next, as shown in (A) of FIG. 8, the transfer mechanism 318 gripping the specimen container 317 is moved to an upper position of the holder 319 positioned at a collection specimen transfer destination position 312. Then, as shown in (B) of FIG. 8, the transfer mechanism 318 is moved downward until the specimen container 317 is arranged in the holder 319 positioned at the collection specimen transfer destination position 312. Next, as shown in (C) of FIG. 8, the grip parts of the chuck mechanism 318a are opened, and the transfer mechanism 318 is moved upward as shown in (D) of FIG. 8.

In the case where the specimen container 317 is transferred from the holder 319 to the rack 316, an operation opposite to the above-described case is performed ((D)→(C)→(B)→(A) of FIG. 8→(E)→(D)→(C)→(B)→(A) of FIG. 7).

Figure 9:
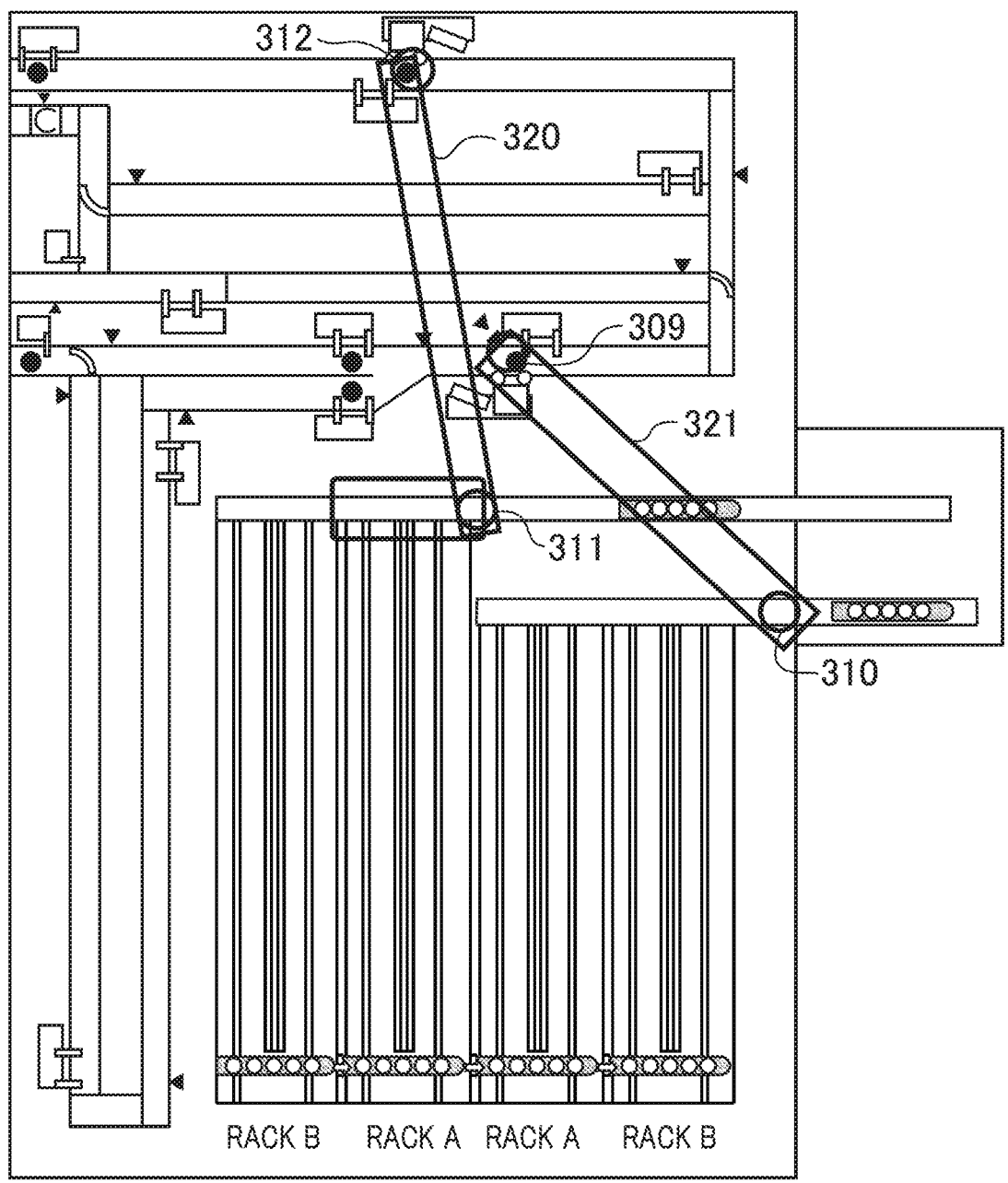
FIG. 9 is an explanatory diagram of an operation range of the transfer mechanism.

FIG. 9 is an explanatory diagram of an operation range of the transfer mechanism 318.

In FIG. 9, a transfer mechanism operation range 321 is a range in which the specimen container is transferred from the transfer start position 309 to the rack transfer destination position 310. A transfer mechanism operation range 320 is a range in which the specimen container is transferred from the collection specimen transfer position 311 to the collection specimen transfer destination position 312. The transfer mechanism 318 is arranged in each of the transfer mechanism moving ranges 320 and 321.

As described above, according to the first embodiment of the present invention, a plurality of kinds of racks is held in the empty rack holding area 330, the rack A or the rack B can be used for conveyance of the specimen container according to an application, and the specimen containers are transferred from the holder to the rack after a fixed number of specimen containers are collected. Thus, it is possible to suppress an occurrence of a state in which the rack does not have a part where no specimen container is mounted.

Namely, according to the first embodiment of the present invention, it is possible to realize the sample container transfer device capable of handling a plurality of racks in which the specimen container can be efficiently transferred from the preprocessing system 102 to the carrier (rack) used in the analysis system 109 and the specimen containers can be transferred to a plurality of kinds of carriers (racks) of the analysis system 109.

It should be noted that a part that is not described in the example of FIG. 3 has the same configuration as the example of FIG. 2.

Second Embodiment

Next, a second embodiment of the present invention will be described.

Figure 10:
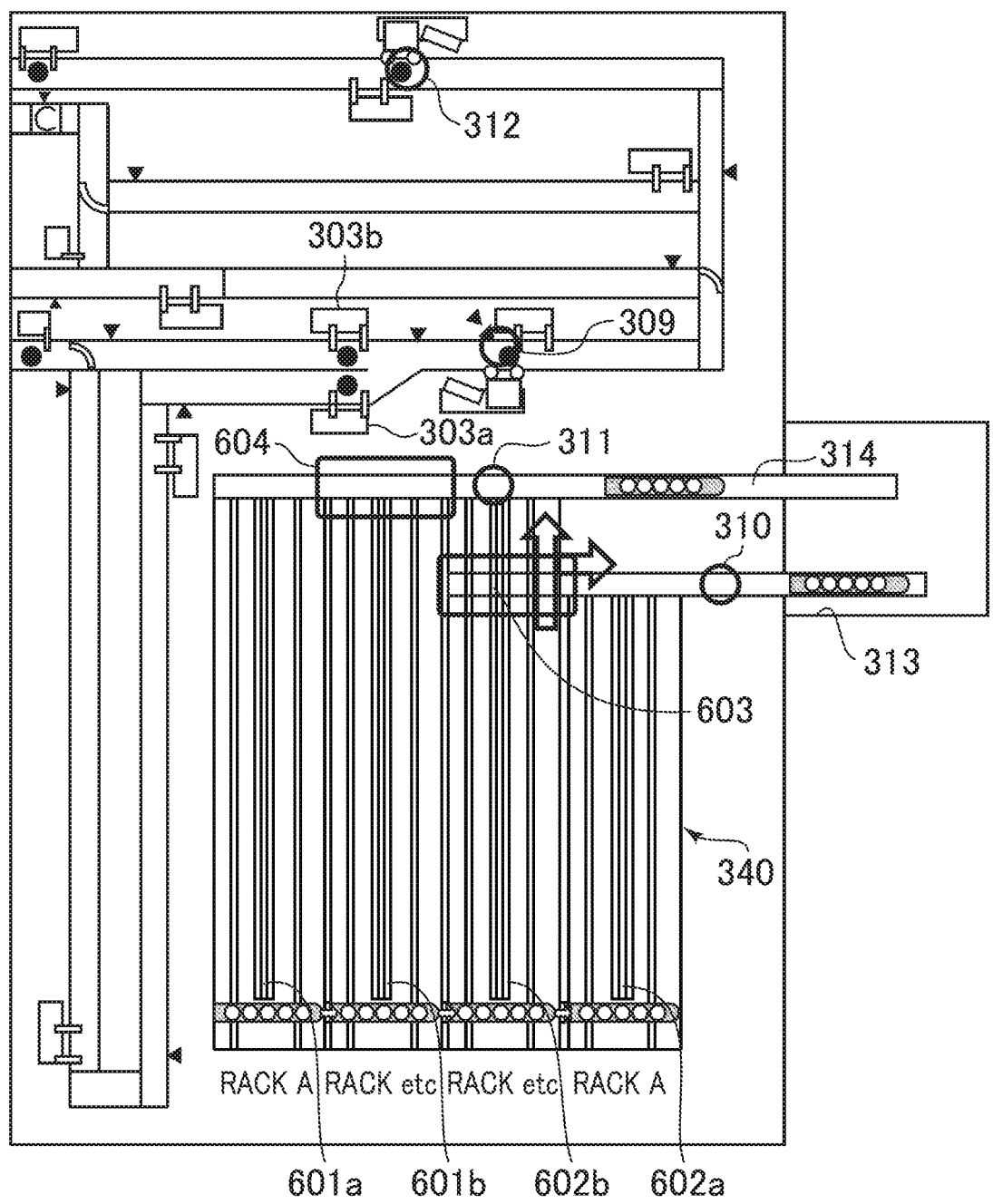
FIG. 10 is an outline configuration diagram of a specimen transfer device according to a second embodiment of the present invention.

FIG. 10 is an outline configuration diagram of a specimen transfer device according to a second embodiment of the present invention.

The first embodiment shown in FIG. 3 is effective for only a case of two kinds of racks whereas the second embodiment shown in FIG. 10 is an example effective for even a case of three or more kinds of racks.

As a different point between the first embodiment and the second embodiment, the second embodiment includes an empty rack holding area 340 having a conveyance line 602a for a rack having a rack kind A, a carry-in line 601a for the rack having the rack kind A, a conveyance line 602b for the other kinds of racks, and a carry-in line 601b for the other kinds of racks, a conveyance rack identifying area 603 in which the kind of rack conveyed to a rack conveyance line 313 is identified, and a carry-in rack identifying area 604 in which the kind of rack conveyed from a rack conveyance line 314 is identified.

The other configurations of the second embodiment are the same as those of the first embodiment.

Racks of the most frequently used kind among a plurality of kinds of racks are conveyed to the rack carry-in line 601a and the rack conveyance line 602a. On the other hand, the other kinds of racks are conveyed to the rack carry-in line 601b and the rack conveyance line 602b.

The kind of rack on the rack conveyance line 602b is identified by the conveyance rack identifying area 603. In the case where an analysis item for a transferred specimen matches the kind of rack, the rack is conveyed to the rack conveyance line 313, and is conveyed after the specimen is transferred.

In the case where it is identified by the conveyance rack identifying area 603 that the analysis item for the transferred specimen is different from the kind of rack, the rack is conveyed to the rack conveyance line 314, and is conveyed to the rack carry-in line 601a or 601b after the kind of rack is identified by the carry-in rack identifying area 604.

The same effect as the first embodiment can be obtained even in the second embodiment of the present invention. In addition, even in the case where the number of kinds of racks is three or more, it is possible to realize the sample container transfer device capable of handling a plurality of racks in which the specimen container can be transferred to the rack of the analysis system.

Third Embodiment

Next, a third embodiment of the present invention will be described.

Figure 11:
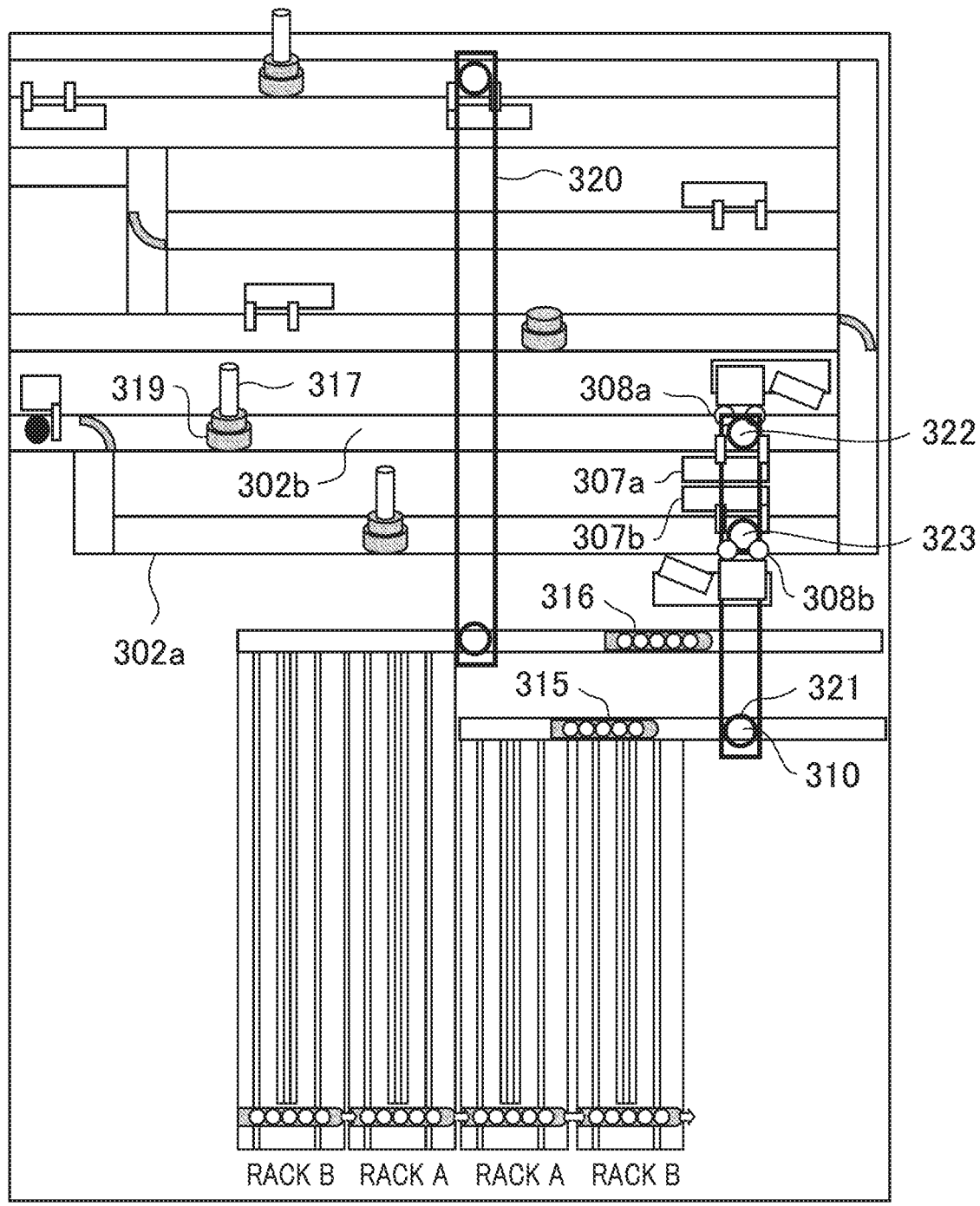
FIG. 11 is an outline configuration diagram of a specimen transfer device according to a third embodiment of the present invention.

FIG. 11 is an outline configuration diagram of a specimen transfer device according to a third embodiment of the present invention.

In the first embodiment shown in FIG. 3, only one transfer start position is provided. On the other hand, in the third embodiment shown in FIG. 11, two transfer start positions such as a first transfer start position 322 and a second transfer start position 323 are provided. One rack transfer destination position 310 is provided for the first transfer start position 322 and the second transfer start position 323.

In FIG. 11, the first transfer start position 322 is arranged on a line 302b, and holders 319 mounting specimen containers the number of which matches that of specimen containers to be mounted on a rack 315 are collected by a stopper 307a. Then, the bar-code of the specimen container is read by a bar-code reader 308a.

In addition, the second transfer start position 323 is arranged on a line 302a, and the holders 319 mounting the specimen containers the number of which matches that of specimen containers to be mounted on the rack 315 are collected by a stopper 307b. Then, the bar-code of the specimen container is read by a bar-code reader 308b.

The specimen containers 317 are transferred from the holders 319 to the rack 315 from the first transfer start position 322 or the second transfer start position 323 where the holders 319 the number of which matches that of specimen containers to be mounted on the rack 315 are collected earlier.

Since a predetermined number of specimen containers are collected at the first transfer start position 322 and the second transfer start position 323, the stoppers 303a and 303a arranged on the upstream side of the transfer start position in the first embodiment are not arranged in the third embodiment.

The other configurations of the third embodiment are the same as those of the first embodiment.

The same effect as the first embodiment can be obtained even in the third embodiment of the present invention.

It should be noted that as similar to the second embodiment, three or more kinds of racks can be used in the third embodiment.

It should be noted that the present invention may be configured in such a manner that time management is conducted without waiting until the holders (first carriers) 319 the number of which matches that of specimen containers that can be mounted on the rack (second carrier) 315 or the like are collected, the specimen containers are taken out from the holders 319 after a certain period of time elapses, and are transferred to the rack 315.

In addition, a specimen, a solution for calibration, and a sample for accuracy management are collectively referred to as a sample in the application.

LIST OF REFERENCE SIGNS

101: specimen transfer device, 102: preprocessing system, 103: specimen feeding device, 104: holder conveyance route, 105: controlling computer, 106: centrifugal device, 107: unplugging device, 108: dispensing device, 109: analysis system, 110: plugging device, 111: specimen housing device, 112: rack conveyance route, 113: communication circuit, 301: separation mechanism, 301a: specimen container reception position, 302a, 302b: conveyance line, 303a, 303b, 307, 307a, 307b: stopper, 304: rack sorting area, 305a, 305b: rack carry-in line, 306a, 306b: rack discharge line, 308, 308a, 308b: bar-code reader, 309: transfer start position, 310: rack transfer destination position, 311, 312: collection specimen transfer position, 313, 314: rack conveyance line, 315, 316, 401, 402: rack, 317: specimen container, 318: transfer mechanism, 318a: chuck mechanism, 319: holder, 320, 321: transfer mechanism operation range, 322: first transfer start position, 323: second transfer start position, 324: holder discharge line, 330, 340: empty rack holding area, 601a, 601b: rack carry-in line, 602a, 602b: rack discharge line, 603: conveyance rack identifying area, 604: carry-in rack identifying area

The invention claimed is:

1. A sample container transfer device comprising:
a first carrier conveyance path configured to convey a plurality of first carriers, each mounting a sample container from a preprocessing system;
a separation mechanism configured to separate the first carrier conveyance path into a plurality of first carrier conveyance paths in accordance with an analysis item of a sample in the sample container mounted on each of the plurality of first carriers conveyed from the preprocessing system or the shape of the sample container;
a plurality of stoppers, each of which is arranged for one of the plurality of first carrier conveyance paths and allows each of the first carriers to stop on the plurality of first conveyance paths before reaching a transfer start position, each of the plurality of first carrier conveyance paths having a different transfer start position from which the plurality of first carriers is transferred to a single rack transfer destination position for all of the different transfer start positions, the single rack transfer destination being located on a second carrier discharge path configured to discharge a plurality of second carriers mounting a plurality of sample containers to an analysis system;
a second carrier carry-in path configured to carry in the plurality of second carriers from the analysis system;
a second carrier holding area configured to hold the plurality of second carriers to be conveyed to the second carrier discharge path, and hold the plurality of second carriers carried in from the second carrier carry-in path;
a first transfer machine configured to transfer the sample containers mounted on the plurality of first carriers from the plurality of different transfer start positions to the single rack transfer destination position in the plurality of second carriers on the second carrier discharge path; and
an operation control unit configured to control operations of the first carrier conveyance path, the separation mechanism, the plurality of stoppers, the second carrier discharge path, the second carrier carry-in path, and the first transfer machine, select any one of the plurality of second carriers in accordance with the analysis item of the sample in the sample containers mounted on the plurality of first carriers or a shape of the sample containers, and transfer the sample containers mounted on the plurality of first carriers from one of the plurality of different transfer start positions to the selected second carrier; and
a second transfer machine configured to transfer sample containers mounted on second carriers on the second carrier carry-in path to a collection specimen transfer position;
wherein the operation control unit is configured to control operation of the second transfer machine and to control the plurality of stoppers such that, when a number of first carriers stopped at a first stopper of the plurality of stoppers matches a maximum number of sample containers that can be mounted on the selected second carrier, the first stopper is released so as to allow the first carriers stopped at the first stopper to proceed to one of the plurality of different transfer start positions and the sample containers mounted on the first carriers to be transferred to the selected second carrier by the first transfer machine.

2. The sample container transfer device according to claim 1,
wherein the plurality of second carriers includes two different second carriers.

3. The sample container transfer device according to claim 1,
wherein the plurality of second carriers includes three or more different second carriers.

4. The sample container transfer device according to claim 1, wherein the analysis item for the sample includes at least one of a solution for calibration and a sample for accuracy management.

* * * * *